United States Patent [19]
Johnson

[11] Patent Number: 5,639,067
[45] Date of Patent: Jun. 17, 1997

[54] MOTORCYCLE STAND

[76] Inventor: Robert C. Johnson, 7741 237th Ave. NE., Stacy, Minn. 55079

[21] Appl. No.: 472,346

[22] Filed: Jun. 7, 1995

[51] Int. Cl.$^6$ .................................................... B66F 7/22
[52] U.S. Cl. ................................................................ 254/131
[58] Field of Search ......................... 254/131, 94, 422, 254/15, 17, DIG. 3; 248/352; 211/17, 22

[56] References Cited

U.S. PATENT DOCUMENTS

| | | |
|---|---|---|
| 1,171,049 | 2/1916 | Jeffery . |
| 1,307,600 | 6/1919 | Rose et al. . |
| 1,354,529 | 10/1920 | Alexander ............................ 254/131 |
| 1,492,461 | 4/1924 | Howe .................................. 254/131 |
| 4,113,235 | 9/1978 | Hartman .............................. 254/131 |
| 4,180,253 | 12/1979 | Ivers et al. .......................... 254/131 |
| 4,193,582 | 3/1980 | Neilsen ............................... 254/131 |
| 4,324,384 | 4/1982 | Elser ................................... 254/131 |
| 4,348,010 | 9/1982 | Baxter ................................. 254/131 |

Primary Examiner—Robert C. Watson
Attorney, Agent, or Firm—Moore & Hansen

[57] ABSTRACT

A motorcycle stand including a pivotable rotating support surface that may be positioned beneath the frame of the motorcycle. Positioning the stand near the rear of the frame elevates the rear wheel from the ground, and positioning the stand near the front of the frame elevates the front wheel off the ground.

The rolling support surface is preferably coated with a layer of urethane to protect the surface of the frame from scratches or other damage that could result from coming into contact with the motorcycle stand. The support surface is a roller assembly the ends of which are attached to supports that rest on the ground. Preferably, these supports each have two feet, resulting in four support points resting on the ground for a stable foundation.

8 Claims, 3 Drawing Sheets

MOTORCYCLE STAND

BACKGROUND OF THE INVENTION

1. Technical Field

The present invention relates generally to jacks, and more particularly to portable jacks or supports for elevating at least one of the two ends of a motorized, two-wheel vehicle such as a motorcycle.

2. Background Information

The need has existed ever since motorized two-wheel vehicles were first developed for a convenient way to service the wheel and related components at one end of the vehicle. Although ramps or lifts may be helpful, they generally take up a large amount of space. Furthermore, the motorcycle may require emergency servicing at a location remote from the bulky ramps and lifts, as when a mechanical failure occurs while the motorcycle is on the road.

Attempts have also been made to rely on the motorcycle kickstand to support the cycle while servicing it. However, the kickstand, although attached directly to the frame of the cycle itself and therefore extremely portable, has a relatively pointed end that may dig into sand, grass or hot blacktop, resulting in unstable support for the motorcycle. Additionally, using the kickstand will not lift either the front or rear wheel of the cycle clear of the ground.

Devices are also known for elevating automobiles by engaging an axle of the vehicle. However, motorcycles lack a suitably exposed axle, and the adaptation of such devices for motorcycles have until now resulted in the risk of scratching or damaging the surface of the motorcycle frame with the exposed surfaces of the lift.

The motorcycle stand of the present invention overcomes difficulties described above and affords other features and advantages heretofore not available.

SUMMARY OF THE INVENTION

The preferred embodiment of the motorcycle stand includes a rotating support surface that may be positioned beneath the frame of the motorcycle. Positioning the stand near the rear of the frame elevates the rear wheel from the ground, and positioning the stand near the front of the frame elevates the front wheel off the ground.

The rolling support surface is preferably coated with a layer of urethane to protect the surface of the frame from scratches or other damage that could result from coming into contact with the motorcycle stand. The support surface is a roller the ends of which are attached to supports that rest on the ground. Preferably, these supports each have two feet, resulting in four support points resting on the ground for a stable foundation.

The roller pivots between a lower and an upper position. In the lower position, it may be easily positioned beneath the motorcycle frame. A lever handle is attachable to one end of the motorcycle stand, and the lever handle may be used to pivot the roller from the lower position to the upper position. Upon pivoting the roller, it comes into contact with the lower surface of the motorcycle frame, and elevates the desired end of the motorcycle off the ground for easy servicing of the motorcycle.

Other objects and advantages of the invention will become apparent from the following detailed description and from the appended drawings in which like numbers have been used to describe like parts throughout the several views.

DESCRIPTION OF THE PREFERRED EMBODIMENT

Figure 1:
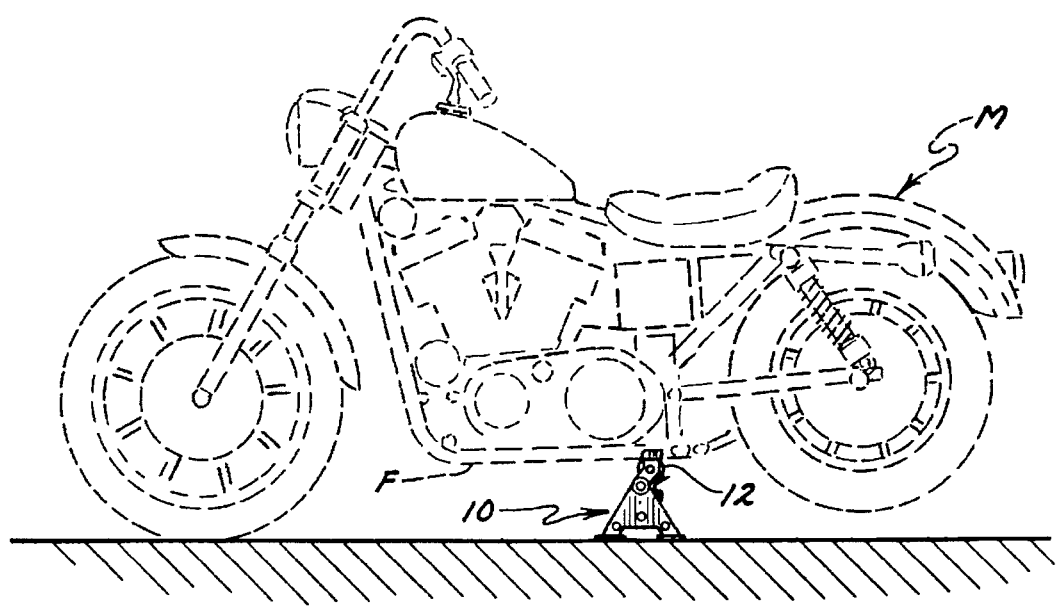
FIG. 1 is a side elevation showing the motorcycle stand positioned beneath and supporting a motorcycle.
Figure 2:
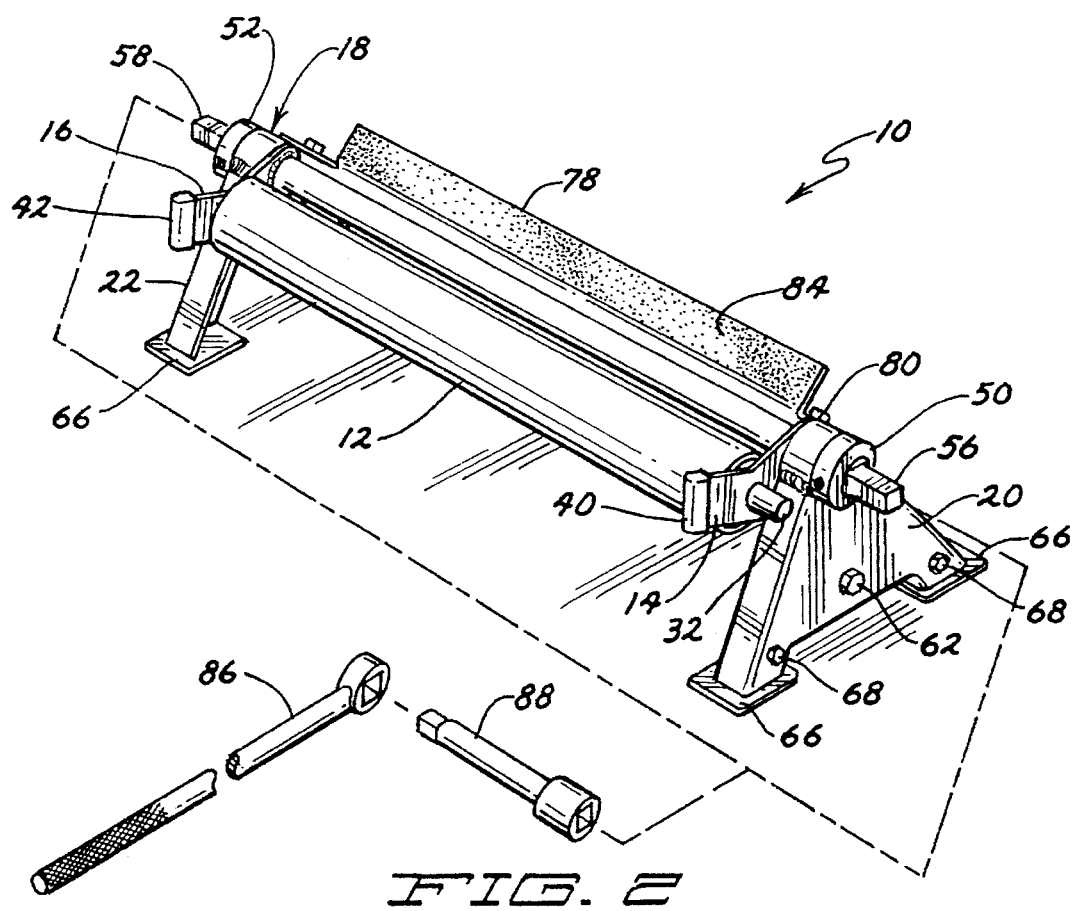
FIG. 2 is a perspective view of the preferred embodiment of the motorcycle stand showing the preferred version of the pivot handle.

With reference to the drawings, and in particular to FIG. 2, the motorcycle stand is generally indicated by reference numeral 10. Motorcycle stand 10 includes a roller support assembly 12 rotatably mounted to first bracket 14 and second bracket 16. As seen in FIG. 1, the frame F of motorcycle M rests on roller support assembly 12. Brackets 14, 16 are pivotally mounted to base assembly 18, which includes first base member 20 and second base member 22.

Figure 3:
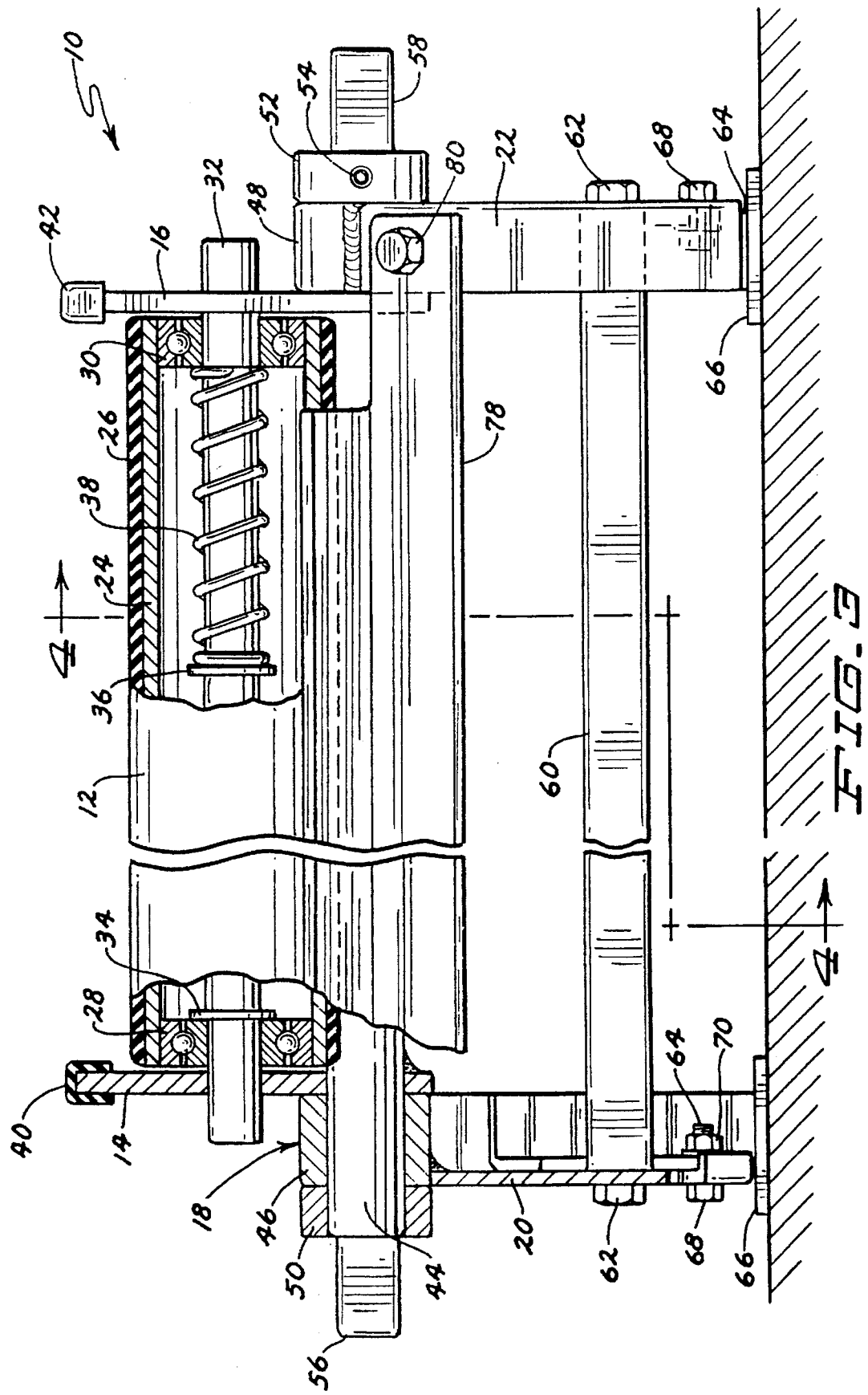
FIG. 3 is a front sectional view showing the roller support in the support position.

Referring to FIG. 3, roller support assembly 12 preferably includes a tube 24 coated with an outer layer 26 of a soft material such as rubber or a urethane compound. The urethane layer may be applied using techniques generally known to those skilled in the art. At the ends of tube 24 are fixedly positioned first and second bearings 28, 30 respectively. Passing through the length of tube 24 and the bearings 28, 30 is a roller shaft 32. Roller shaft 32 preferably includes first and second stops 34, 36 respectively, fixedly attached to the length thereof, as by welding. As illustrated, roller shaft 32 passes through a spring 38 which bears against second stop 36 and second bearing 30. Spring 38 ensures that roller support assembly 12 securely engages openings in first and second brackets 14, 16. Preferably, when spring 38 is fully extended, first stop 34 bears against first bearing 28. When properly positioned, the ends of roller shaft 32 pass through openings in first and second brackets 14, 16, which hold roller support assembly 12 in position. As may also be seen in FIG. 3, the ends of brackets 14, 16 are preferably covered by first and second rubber tips 40, 42 respectively. As may be seen in FIG. 1, the ends of brackets 14, 16 extend upward from motorcycle stand 10 and serve as guides that help ensure that frame F of motorcycle M is properly centered on roller support assembly 12 of motorcycle stand 10.

First and second brackets 14, 16 are fixedly attached as by welding to rotatable pivot shaft 44. First and second base members 20, 22 include first and second integral support members 46, 48, respectively, that pivotally support pivot shaft 44. First and second support members 46, 48 may be formed from the same piece as the remainder of first and second support members 46, 48, respectively, or may be fixedly attached thereto as by welding. Pivot shaft 44 is held in position in first and second support members 46, 48 by first and second set collars 50, 52, respectively, which are positioned over the ends of pivot shaft 44 and held in position by set screws 54. First and second set collars 50, 52 include projecting members 56, 58, respectively, which are generally square in cross section.

Referring to FIG. 3, when fully assembled, the proper distance between first and second base members 22, 24 is maintained by spacer bar 60, rendering added stability to motorcycle stand 10. Spacer bar 60 preferably threadedly engages first and second base members 22, 24 as by bolts 62. Additionally, as most clearly illustrated in FIG. 4, the overall height of motorcycle stand 10 may be adjusted by adjusting the position of four legs 64. Each leg 64 includes a foot pad 66, and each leg 64 is attached to a base member as by a bolt 68 threadedly engaging nut 70. By aligning bolt 68 with one of the various holes 72 in leg 64, the height of motorcycle stand may be raised or lowered to meet the needs of the particular motorcycle being serviced.

Figure 4:
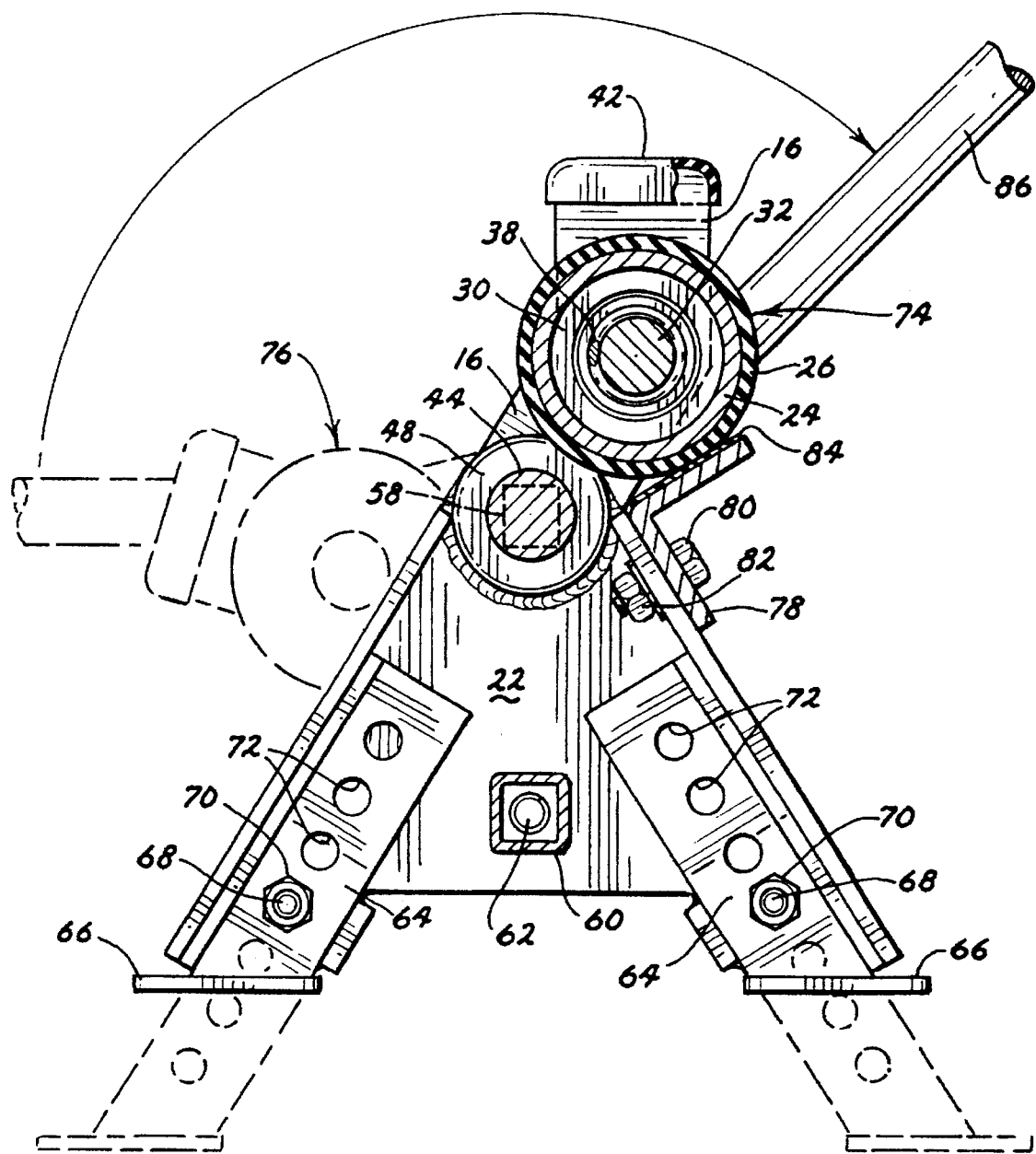
FIG. 4 is a side sectional view taken along line 4—4 of FIG. 3.

As illustrated in FIGS. 2, 3 and 4, roller support assembly 12 may be positioned between an elevated support position 74 for supporting the motorcycle and a lowered, clearance position 76 for positioning motorcycle stand 10 beneath frame F of motorcycle M. When in support position 74, roller support assembly 12 rests against roller stop 78. As may be seen in FIG. 4, it is preferred that when roller support assembly 12 is in support position 74, it has rotated a few degrees past vertical to ensure secure, continued positioning against roller stop 78. Roller stop 78 extends between and threadedly engages first and second base members 20, 22, as by bolts 80 and nuts 82. The surface of roller stop 78 against which roller support assembly 12 rests has preferably been rendered coarse, as by application of a grainy grip tape 84, to prevent slipping of roller support assembly 12 with motorcycle M resting thereon.

A pivot handle 86, including handle adaptor 88, is used to rotate roller support assembly 12 between clearance position 76 and support position 74. Pivot handle 86 is preferably a two piece unit to render it easier to transport. It is also preferred that the gripping portion of handle 86 be knurled to make it easier to use. As best seen in FIG. 2, handle adaptor 88 is configured to engage first or second projecting members 56, 58 for rotating roller support assembly 12 between clearance position 76 and support position 74.

In use, motorcycle stand 10 is preferably transported in a disassembled condition to take up less space and thereby improve portability. Motorcycle stand 10 may easily be transported in a box or pouch, not shown. When it is needed for servicing motorcycle M, motorcycle stand 10 may be assembled by first positioning pivot shaft 44 within the openings of first and second support members 46, 48. First and second set collars 52, 54 should then be positioned over the ends of pivot shaft 44 projecting from support members 46, 48, so that they abut against first and second brackets 14, 16, respectively. Set collars 52, 54 should then be fixed in position using the set screws 54 provided therewith. Next, roller stop 78 is attached to first and second base members 20, 22 using bolts 80 and nuts 82. Spacer bar 60 may then be attached to base members 20, 22 using bolts 62. Finally, roller support assembly 12 may be inserted in the resulting base assembly 18 by inserting an end of roller shaft 32 through the opening in second bracket 16, then pushing on the other end of roller shaft 32 to compress spring 38 until roller shaft 32 may be positioned inside of first bracket 14. Roller support assembly 12 is then adjusted until the end of roller shaft 32 engages the opening in first bracket 14 and is caused to project therethrough by spring 38. Once fully assembled, the height of motorcycle stand 10 may be adjusted by repositioning legs 64 as needed until appropriate engagement with frame F of motorcycle M is accomplished. It should be understood that, because of great variations in the sizes and styles of various motorcycles, different sizes of motorcycle stand 10 may be necessary to accommodate the many different brands and styles of motorcycles.

After assembly, motorcycle stand 10 is positioned underneath frame F of motorcycle M. To raise the front tire off the ground, motorcycle stand 10 is positioned near the front of frame F. To raise the rear tire off the ground, motorcycle stand 10 is positioned near the rear of frame F. Pivot handle 86 is positioned with handle adaptor 88 engaging first projecting member 56 or second projecting member 58. Pivot handle 86 is then rotated to lift roller support assembly 12 upward. Engagement of roller support assembly 12 with frame F of motorcycle M will result in roller support assembly 12 beginning to rotate while lifting the designated wheel of the motorcycle from the ground. Pivot handle 86 is rotated and roller support assembly 12 rolls along the lower surface of frame F until coming into contact with roller stop 78. The designated end of motorcycle M is now clear of the ground, and further rotation of roller support assembly 12 is prevented by the weight of motorcycle M and the friction between roller support assembly 12 and grip tape 84 on roller stop 78.

While the preferred embodiments of the invention have been described, it should be understood that various changes, adaptations and modifications may be made therein without departing from the spirit of the invention and the scope of the appended claims.

What is claimed is:

1. A portable motorcycle support stand for elevating an end of a motorcycle having a frame, comprising:

a base assembly;

a rotatable support assembly pivotally attached to said base assembly, said rotatable support assembly pivotable between a support position and a clearance position, said rotatable support assembly being engageable with the frame of the motorcycle when in said support position;

a detachable pivot handle for pivoting said rotatable support assembly between said support position and said clearance position, whereby said rotatable support assembly elevates an end of the motorcycle when in said support position; and a roller stop attached to said base assembly, said rotatable support assembly bearing against said roller stop when in said support position.

2. The portable motorcycle support stand described in claim 1, wherein said rotatable support assembly comprises:

a rotatable tube element rotatably mounted on its ends to a first bracket member and a second bracket member, said first and second bracket members being pivotally mounted to said base assembly.

3. The portable motorcycle support stand described in claim 2, wherein said base assembly further comprises:

a first base member and a second base member;

a first support member integral with said first base member and a second support member integral with said second base member; and a pivot shaft extending between and rotatably engaging said first and second support members, said first and second bracket members being fixedly attached to said pivot shaft.

4. The portable motorcycle support stand described in claim 3, wherein said rotatable tube element further comprises:

an external surface portion generally softer and more frictional than the underlying material thereof.

5. The portable motorcycle support stand described in claim 4, wherein said external surface portion is made of urethane.

6. The portable motorcycle support stand described in claim 5, wherein said roller stop includes a bearing surface against which said rotatable tube element rests when said rotatable support assembly is in said support position, said bearing surface being coated with a coarse adhesive material.

7. The portable motorcycle support stand described in claim 4, further comprising:

first, second, third and fourth leg elements, said first and second leg elements cooperative with said first base member and said third and fourth leg elements cooperative with said second base member.

8. The portable motorcycle support stand described in claim 7, wherein:

said first and second leg elements are releasably attachable to said first base member and said third and fourth leg elements are releasably attachable to said second base member; and said first, second, third and fourth leg elements provide multiple attachment points, whereby the height of the portable motorcycle support stand may be adjusted by repositioning said leg elements relative to said base members.

* * * * *